United States Patent [19]

Soehnlen

[11] 4,358,464
[45] Nov. 9, 1982

[54] PROCESS FOR CONVERTING SOUR WHEY INTO SWEET WHEY AND PRODUCT

[75] Inventor: Joseph A. Soehnlen, Navarre, Ohio

[73] Assignee: Superior Dairy, Inc., Canton, Ohio

[21] Appl. No.: 933,605

[22] Filed: Aug. 14, 1978

Related U.S. Application Data

[63] Continuation-in-part of Ser. No. 821,099, Aug. 2, 1977, abandoned, which is a continuation-in-part of Ser. No. 699,718, Jun. 25, 1976, abandoned.

[51] Int. Cl.³ ............................................. A23C 21/02
[52] U.S. Cl. ...................................... 426/41; 426/271; 426/491; 426/583
[58] Field of Search ................. 426/271, 583, 41, 491; 195/66 R, 31 R, 115, 133, 134, 119; 210/38 A, 37 R

[56] References Cited

U.S. PATENT DOCUMENTS

| | | | |
|---|---|---|---|
| 2,566,477 | 9/1951 | Abrahamczik | 426/41 |
| 2,781,267 | 2/1957 | Traisman et al. | 426/491 |
| 3,629,073 | 12/1971 | Cayle | 195/66 R X |
| 3,669,678 | 6/1972 | Kraft | 426/583 X |
| 3,737,326 | 6/1973 | Basso et al. | 426/583 |
| 3,852,496 | 12/1974 | Weetall et al. | 426/41 |
| 3,896,240 | 7/1975 | Gruette et al. | 426/583 X |
| 3,896,241 | 7/1975 | Malaspiha et al. | 426/271 |

OTHER PUBLICATIONS

Whey Products Conference, Proceedings; 1974, Agricultural Research Service, U.S. Dept. of Agriculture; pp. 20–29, 76–115.

*Primary Examiner*—William F. Smith
*Attorney, Agent, or Firm*—Frease & Bishop

[57] ABSTRACT

Sour whey resulting from manufacture of cottage cheese or cream cheese is converted into a food product superior to either sweet whey or sour whey, by enzymatic splitting of the lactose to glucose and galactose, followed by deionization and preferably concentration.

20 Claims, No Drawings

PROCESS FOR CONVERTING SOUR WHEY INTO SWEET WHEY AND PRODUCT

CROSS-REFERENCE

This is a continuation-in-part of my application for patent Ser. No. 821,099 filed Aug. 2, 1977 now abandoned which is a continuation-in-part of application for patent Ser. No. 699,718 filed June 25, 1976, now abandoned.

BACKGROUND OF THE INVENTION

The liquid whey remaining after removal of the curd in cheese making contains about half of the nutritive materials present in the whole milk, and consists principally of a water solution of lactose (milk sugar) along with proteins (other than the casein which makes up most of the curd), together with most of the calcium, and some lipids and vitamines.

The sweet whey produced by curdling milk with rennet in preparing cured cheese can be concentrated or dried for addition to various food products, and large quantities of whey are processed in this manner.

Sour whey, produced by acidification of milk, in the preparation of cottage cheese or cream cheese, cannot be concentrated or dried satisfactorily because of its acidity, which is accentuated by concentration, because of the peculiar properties of lactic acid. Neutralizaton of the lactic acid does not solve the problem because of the resulting increase in salinity.

Sour whey not only has found no use capable of absorbing the large quantities which are produced, but has had a negative value because of the cost of finding some way to get rid of it. It cannot be used profitably as fertilizer because the cost of transportation and application to the soil is greater than its value as a fertilizer. It cannot be dumped in streams because it pollutes them. It is not even permitted to be dumped in sewers, unless a substantial fee is paid, because it increases the cost of operation of sewage treatment facilities.

OBJECTS OF THE INVENTION

The objects of the invention are to eliminate the problems and costs resulting from all of the previously known ways to dispose of sour whey, and instead to provide a way or ways to make practical and profitable use of the high quality food values present in the sour whey.

SUMMARY OF THE INVENTION

This invention involves the discovery that sour whey can be modified to change its composition and properties in minor but very important respects so that its food values will be palatable and can be economically recovered and profitably used.

The modification of the sour whey involves splitting or hydrolysis of the lactose into glucose and galactose by the action of an enzyme, without significant modification of other constituents, and also removal of at least a substantial proportion of the acid ions, and preferably also some of the ions of mineral bases, by a suitable ion-exchange material.

A principal result of these operations is the elimination of a high proportion of the mineral ions along with the ions of lactic acid and other soluble organic acids. The consequence is the reduction or elimination of the salty taste and particularly of the sour flavor of the lactic acid, which is unpalatable to many people and which makes sour whey unsuitable for many food purposes. A further result is to reduce or substantially eliminate both lactic acid and lactose, which are the source of serious problems in concentration or drying of whey. In addition, the splitting of most or preferably substantially all of the lactose reduces or eliminates the problem of intolerance to milk sugar by many people, as well as improving the flavor because of the much greater inherent sweetness of the two monosaccharoses, glucose and galactose, than of the original disaccharose, lactose, contained in the milk.

These results are accomplished without significant loss of food value, since the only materials removed are ions, and particularly ions of the lactic acid resulting from fermentation of a small part of the lactose. In addition, some mineral ions such as calcium and phosphate may be removed, but a considerable part of these desirable constituents is retained in a combined, non-ionized, form. Almost all of the organic constituents are retained, including the sugar (in an improved, more palatable, and more digestible form), the proteins, lipids, and vitamines.

When the modified whey is concentrated or dried, it becomes quite sweet and can be used in a great variety of foods in place of or in addition to other sweeteners. Nutritionally such use of the product is beneficial because of the presence of substantial proportions of other food elements and particularly of proteins such as albumin and globulin, as well as vitamines. By contrast, previously known whey concentrates are not particularly sweet because of the low solubility and inherently low sweetness of lactose.

The splitting of most of, that is, more than half of, the lactose is an essential part of the invention since the low solubility and hygroscopicity of the lactose would not only limit the desirability and usefulness of any product of which lactose is the major constituent, but also would greatly complicate all subsequent operations. Splitting of the lactose is most easily accomplished by use of a natural enzyme, of which only a very small amount is needed, and which does not introduce constituents which could create subsequent problems.

The extent of hydrolysis or splitting of lactose is preferably as nearly complete as is economically attainable, but will generally be somewhat short of 100% conversion. At least 50% conversion is generally desirable, and will result in at least as many molecules of glucose and of galactose as of residual lactose, so that the properties of those two sugars will predomiate. Preferably the conversion is carried further beyond 50% to splitting of two thirds, or still better three fourths, or in some cases substantially all of the lactose.

The other essential step of deionization may be carried out in various ways, but should always involve at least partial deacidification with a suitable anion-exchange material to reduce substantially the lactic acid concentration in the whey. If more complete removal of the mineral salts is desired, the ions in the whey may be removed in two steps, preferably first a demineralization with a cation-exchange material to remove free metal ions such as calcium, magnesium and sodium, followed by deacidification with an anion-exchange material to remove lactic acid ions and other anions which contribute to an objectionable acidity.

I have found that deacidification is sometimes facilitated by the two-step procedure, and that the two successive deionization operations just mentioned are very simple, effective, and inexpensive for removal of the troublesome lactic acid. On the other hand, if retention of most of the calcium is desired, a one-step procedure with anion-exchange material only should be used.

The first treatment in the two-step deionization process, with cation-exchange material, removes metal ions, primarily calcium, along with magnesium, as well as some sodium and potassium, and converts such lactic acid salts as may be present to free lactic acid, thereby temporarily increasing the acidity of the whey. Because of the relatively low dissociation constant of lactic acid, the increased acidity does not interfere with removal of the metal ions.

The second treatment in the two-step deionization process, with anion-exchange material, removes the ions of the acids and particularly of lactic acid, which is usually the primary acidic material present in the whey, thereby reducing the acidity of the whey, preferably to approximate neutrality.

If lactose hydrolysis preceded the deionization, the essential operations for conversion of the sour whey to a useful food product are completed. However, other operations such as dewatering may be desirable for enhancing value of the product for food purposes.

If a one-step deionization treatment is chosen, the same anion-exchange material can be used. It removes most of the lactic acid, but some is retained in the form of salts, particularly as calcium lactate, which is not troublesome as long as the whey is nearly neutral.

It is not essential that the several steps of the process occur in any particular sequence, since splitting of lactose and deionization are distinct operations having only a minor effect one on the other. Nevertheless, it has been found to be convenient to commence the splitting of the lactose at an early stage of the procedure, so that a small quantity of lactase enzyme will have time to split most of the lactose, at least 50% and preferably much more, before the ion-exchange part of the process.

For purposes for which the water content of the whey is not objectionable, the deacidified whey, in which most or nearly all of the original lactose is replaced by a mixture of glucose and galactose, can be used without further treatment. Usually, though, the water content will be too great for convenience, and it will be desirable to concentrate the whey. This can be done by conventional methods, such as vacuum concentration to produce a liquid concentrate, followed, if desired, by spray drying to produce a completely dry stable powder.

The sweet whey product, thus made from sour whey, is a desirable additive to a great many kinds of food products because of its sweetness and its almost entire absence of other flavors, as well as because of its content of easily digestible sugars and of desirable food proteins, in addition to significant proportions of lipid materials and vitamines, and also minerals if anions only are removed. Moreover, the enzymes added to the milk or produced during the carrying out of the process have a significant benefit to consumers of foods containing the sweet whey product.

Thus the sweet whey product can be added to cereal products such as bread dough, cake mixes, pancake mixes, breakfast cereals, and similar products, and to desserts of many kinds such as ice cream, sherbet, milk drinks, pudding mixes, candies and many others, to enhance their flavor and nutritive value, and reduce their cost.

DETAILED DESCRIPTION

As has been pointed out above, a considerable number of factors can be modified, in the practice of this invention, and the exact composition and condition of the immediate product, and also of the final food product of which it becomes a part, are therefore likewise subject to modification over wide ranges. Some of these variations will be described in the following examples.

EXAMPLE 1

Combined Preparation of Cottage Cheese and Modified Whey

Pasteurized skim milk is brought to a temperature of about 88°–90° F. (31°–32° C.) and a commercial lactase enzyme preparation is added, such as the dry powdered lactase isolated from Saccharomyces lactis by Gist-Brocade in Delft, Holland and sold by Enzyme Development Corp. in New York City. This enzyme is most active at approximate neutrality. Such enzymes are supplied with recommendations for the quantities needed for specified percentages of conversion at particular temperatures and times. A quantity which will hydrolyze 90% of the lactose in six hours is suitable.

After the enzyme is distributed throughout the milk, it is allowed to stand for a time which may be as little as one hour or as much as a day, depending on the quantity of lactase enzyme added, to hydrolyze most and preferably as much as 75% or more of the lactose. This may be in a holding tank or in the cheese vats, depending on the quantity of enzyme used and the time required for its action.

A culture of acid-producing organisms is then added. Suitably, a standard commercial culture containing Streptococcus lactus or similar culture is mixed into the milk in a volume of about 0.1%, in the cheese vats, and allowed to act or grow for approximately three hours until a pH of 5 to 4.5, preferably about 4.7, is attained as the result of lactic acid production, which inactivates the enzyme. A small amount of rennet, on the order of 1 liquid ounce in 5000 gallons of milk (1 milliliter in 630 liters of milk) may be added along with the bacterial culture to supplement the gelling action of the acids produced by the bacterial culture.

The combined action of the initially added lactase, plus further enzymes produced by the bacteria, splits substantially all of the lactose into glucose and galactose during the curdling of the milk.

After the milk has curdled, the curd is cut in the usual manner with wire knives and cooked to about 119°–130° F. (48°–55° C.) to cause separation of the whey.

When the curds and whey have separated, the sour whey is withdrawn from the curds, and the curds can then be prepared for sale as cottage cheese. The whey usually contains a small remaining quantity of suspended solids which are preferably removed from the whey by filtration or by centrifugal clarification, to avoid contamination of the ion-exchange materials in the next steps.

The filtered or centrifugally clarified sour whey is passed through a bed of cation-exchange material, suitably consisting of beads of a synthetic resin such as Amberlite IRC-84 made by Rohm and Haas Co., which consists of spherical particles of about 0.4 mm diameter of a cross-linked acrylic resin with a carboxylic acid functionality having a pK value of 5.3. The rate of passage of the sour whey through the cation-exchange resin is adjusted to accomplish removal of the desired proportion of the metal ions, preferably at least half of the calcium and magnesium ions, and desirably three-fourths or more, thereby changing lactic acid salts to free lactic acid and increasing the acidity to a pH of about 3.5.

The whey is next passed through a bed of an anion-exchange material, suitably consisting of beads of another synthetic resin such as Amberlite IRA-93 made by Rohm and Haas Co., which consists of spherical particles of about 0.4 mm diameter of a polystyrene matrix cross-linked with divinyl benzene and containing a tertiary amine functionality. This treatment removes lactic acid and other acid ions, reducing the acidity to an approximately neutral condition, with a pH in the range of 6 to 8. Preferably the time of contact is adjusted to produce a pH between 6 and 7. However, for some purposes a faintly acid product with a pH somewhat less than 6 may be acceptable.

The finished, properly deacidified whey at this stage has completely lost its lactic acid sour flavor and has become almost tasteless, except that it is somewhat sweeter than most milk because of the presence of the glucose and galactose derived from the original lactose.

The preferred procedure described above is particularly simple and economical, and results in a sweet whey product with properties superior to those of the natural sweet whey resulting from use of rennet alone in producing the neutral, non-acid curd in production of cheddar cheese or other cured cheeses.

In this embodiment of the invention, the combination of enzyme action from the lactase added as such, with the action of enzymes produced by the organisms which sour the milk, results in a rapid and fairly complete conversion of lactose to its component sugars, glucose and galactose, at a lower cost than for conversion by added enzyme only.

Over 90% conversion of lactose is easily accomplished, so that the small residual lactose content is easily tolerated by most people who have difficulty in digesting the lactose in milk.

Moreover, the deionization by ion exchange introduces only the ions of water to replace the mineral ions, and thereby avoids introduction of any foreign materials, and particularly avoids the increased salinity which would result from neutralization of acid ions by introduction of alkaline materials.

The consequence is that a previously almost useless waste product is economically converted to a food product superior to sweet whey as it has heretofore been available.

This modified sweet whey, containing all the food elements of whey except for removal of some of the mineral ions, and involving conversion of the lactose to the far more desirable glucose and galactose, can be used as such as a beverage or component of a beverage, or can be used as the liquid component of any of a great many foods, including soups, puddings, baked goods, frozen desserts, and many others. Moreover, it can be concentrated to produce a new kind of highly nutritious sweetener.

EXAMPLE 2

Partial Demineralization of Sweetened Whey

To produce a whey product for use as an ingredient of a citrus type fruit drink, it is desirable to retain some of the calcium and other mineral ions. Thus a partial demineralization can be carried out in the following manner.

Pasteurized skim milk is mixed with lactase enzyme, and after a few hours for hydrolysis of the lactose, a culture of acid-producing organisms is added, as in Example 1 above, to curdle the milk.

After cutting of the curds, the whey is withdrawn, clarified, and divided into two approximately equal parts. One part is then passed through a bed of cation-exchange material as in Example 1, following which it is remixed with the other part. This procedure reduces the mineral content, principally calcium, by about a half, retaining the other half for its nutritive value and for its contribution to flavor of the final product.

The whey is then passed through a bed of anion-exchange material for removal of lactic acid ions. Citric fruit flavorings are then added. The enhanced sweetness resulting from presence of the glucose and galactose derived from the hydrolysis of lactose gives a pleasant flavor to the product.

The procedure described above, of treating a measured fraction of a total batch, is a convenient way to bring about removal of a predetermined fraction of an ingredient, since it involves only measurement of volume, which is very much simpler than adjusting the extent of a removal procedure, and then verifying it by an assay which can be quite complex and time consuming.

EXAMPLE 3

Modification of Previously Made Sour Whey

Sour whey is prepared in the usual way by inoculating skim milk at room temperature with an acid-forming organism and allowing the milk to curdle, after which the curds are strained off for use as cottage cheese, and the whey is clarified.

The clarified sour whey is then passed through a bed of anion-exchange resin such as the Amberlite IRA-93 described in Example 1, at such a rate that the effluent acquires a pH slightly higher than 6, which substantially eliminates the characteristic lactic acid sour flavor.

The approximately neutral whey is then treated with one of the commercial lactase enzymes which are produced by organisms such as Saccharomyces fragilis. This lactase enzyme may be immobilized on the surface of a glass bead carrier. The whey is kept in contact with the enzyme until at least 50% of the lactose is hydrolyzed, and preferably 75% or more. Thereby the whey acquires a pronounced sweet flavor, modified by a slight saltiness from the mineral elements such as calcium present in original milk.

If the whey is to be used at a later time, it is preferably pasteurized. It may be concentrated in any usual manner, as in a vacuum pan, which greatly enhances its sweetness and sterilizes it so that it may be kept for subsequent use.

EXAMPLE 4

Preparation of Sweet Syrup from Sour Whey

Sour whey from cottage cheese manufacture is inoculated with acid-active lactase enzyme produced by Aspergillus niger, and maintained at 35° C. until 90% of the lactose is hydrolyzed.

The whey is then de-acidified by passing it through a bed of anion-exchange material as described in Example 1, to bring it to a nearly neutral pH value of about 6.

The whey containing glucose and galactose, in place of the original lactose, is then vacuum concentrated to a syrupy consistency, which makes it reasonably stable. The product is a very sweet syrup, consisting primarily of a mixture of sugars, but containing also the proteins and other nutritive constituents of the whey.

The syrup can be used in almost any food product requiring sweetening, at a considerable saving over the use of pure sugar or other commercial sweeteners, or can be used as a table syrup.

EXAMPLE 5

Whey Beverage

Cottage cheese is made from pasteurized skim milk at about 90° F. (32° C.) by addition of diluted phosphoric acid to a pH of about 4.6. After the curd has set, it is cut and cooked to cause separation of the whey, and the curd is removed.

After clarification of the whey, an acid-stable lactase as used in Example 4 is then added and the whey is allowed to stand until about 80% of the lactose is hydrolyzed. The whey is then partially de-acidified by passage through a bed of Amberlite IRA-93, as described in Example 1, at such a rate as to bring its pH value to 5 or more up to 7, depending on the intended use. It is found to have a pleasant sweet flavor. Addition of flavorings and additional sweetener produces agreeable beverages.

Similar beverages can be made from whey produced by the process of Example 1, if the treatment with an anion-exchange material is limited so as to produce a product with a mildly acid pH level between 5 and 7. The flavor will then be slightly different because of the presence of lactic acid instead of phosphoric acid.

EXAMPLE 6

Frozen Desserts

Cottage cheese is made in the manner described in Example 1. The whey is then passed through a bed of IRA-93 anion-exchange material at such a rate as to raise its pH value to about 5. Lactase is added and the whey is allowed to stand until 80% of the lactose is hydrolyzed. It is then vacuum concentrated to about 50% total solids.

The material so produced has a mild, very sweet taste. When flavorings such as chocolate, or fruit flavors are added, and the mix is frozen, a dessert of good texture and pleasant flavor results. Such a dessert is more nutritious than sherbets because of the substantial quantity of high quality protein contained in it, along with significant quantities of several vitamins and minerals, in addition to the two sugars—glucose and galactose.

EXAMPLE 7

Food Recipes

As examples of the many kinds of food products that can be made from sour whey which has been at least partially de-acidified, and has had a major part of the lactose converted to glucose and galactose, the following recipes are presented, in which "de-acidified sour whey" refers to the product of Example 1 above. It should be understood that comparable good results are obtainable using products made by somewhat different procedures, so long as most of the lactic acid is removed, and most of the lactose is hydrolyzed with the result that the sugars present are principally glucose and galactose.

Although improvements are obtained by any substantial reduction in the quantity of lactose and of lactic acid, the problems resulting from presence of these two materials are still very troublesome unless most of the quantity originally present (that is, more than half) is removed or replaced, and preferably much more (such as three-fourths or more), since many people dislike the flavor of lactic acid, and many other experience digestive problems from ingestion of even small amounts of lactose.

A. White Bread

| | |
|---|---|
| 20 lbs. | heated de-acidified sour whey |
| 1¼ lbs. | shortening |
| 1¼ lbs. | sugar |
| ½ lb. | salt |
| 30 lbs. | sifted bread flour |
| 20 | yeast cakes dissolved in 2½ lbs. warm water |

Melt shortening, add sugar, salt, and whey. When lukewarm add yeast and half of the flour, mixing thoroughly. Add remaining flour gradually until no longer sticky. Knead thoroughly, cover, and let rise. Cut down, knead, shape into loaves and place in bread pans. When doubled in bulk, bake 15 minutes at 425° F. then 30 to 35 minutes at 375° F.

B. Whole Wheat Bread

Same as White Bread replacing half of the flour with whole wheat flour and adding 2 lbs. molasses

C. Rolls

Same as White Bread, adding 2 dozen beaten eggs, and shaping into rolls instead of loaves.

D. Griddle Cakes

| | |
|---|---|
| 5 lbs. | de-acidified sour whey |
| 5 lbs. | flour |
| 1 lb. | sugar |
| 1 oz. | salt |
| 3 oz. | baking powder |
| 1 doz. | eggs, well beaten |
| 1 lb. | melted butter |

Mix well and drop tablespoonsful separately on hot greased griddle, turning when brown on bottom.

E. Biscuits

| | |
|---|---|
| 5 lbs. | de-acidified sour whey |
| 5 lbs. | flour |
| 6 oz. | shortening |
| 3 oz. | baking powder |
| 3 oz. | salt |

Mix dry ingredients, work in shortening, add whey gradually, using more or less to proper consistency. Roll out, cut with biscuit cutter. Bake on buttered tin 10 to 15 minutes at 450° F.

F. Bran Muffins

| | |
|---|---|
| 5 lbs. | de-acidified sour whey |

-continued

| | | |
|---|---|---|
| 2½ lbs. | flour | |
| 3 lbs. | bran | |
| 3 lbs. | molasses | |
| 10 | eggs, well beaten | |
| 4 oz. | soda | |
| 4 oz. | salt | |

Mix well and bake in buttered muffin tins 30 to 40 minutes at 375° F.

G. Corn Bread

| | |
|---|---|
| 5 lbs. | de-acidified sour whey |
| 5 lbs. | flour |
| 6 lbs. | corn meal |
| 2 lbs. | sugar |
| 1 lb. | melted or liquid shortening |
| 20 | eggs, well beaten |
| 2 oz. | salt |
| 3 oz. | baking powder |

Mix well and bake 20 minutes at 425° F.

H. Vegetable Soup

| | |
|---|---|
| 10 lbs. | de-acidified sour whey |
| 20 lbs. | chicken stock |
| 6 lbs. | chopped cooked green vegetable (celery, peas, spinach, etc.) |
| 1½ lbs. | butter |
| 1 lb. | flour |
| | Salt and pepper to taste |

Melt the butter, add the flour, and mix into the soup while it is cooking.

I. Omelet

Allow 2 to 3 eggs per person. For each dozen eggs, slightly beaten, add:

| | |
|---|---|
| 6 oz. | de-acidified sour whey |
| | Salt and pepper to taste |

For each 2 people, put 1 oz. butter in hot omelet pan, add mixture. Where it cooks, lift with spatula until all is of creamy consistency. Increase heat until light brown underneath. Fold and turn on hot platter. For a puffy omelet, separate eggs, beat whites separately, then other ingredients, and fold together before cooking, but don't stir during cooking. When bottom is browned, finish in oven to brown top.

J. White Sauce

| | |
|---|---|
| 8 lbs. | de-acidified sour whey |
| 8 oz. | flour |
| 1 lb. | butter |
| | Salt and white pepper to taste |

Melt butter, add flour mixed with seasoning, stir until well blended, add whey gradually until well blended, bring to boil and cook 2 minutes.

K. Cheese Sauce

Add 4 lbs. grated cheese to White Sauce.

L. Lemon Cream Rice

| | |
|---|---|
| 6 lbs. | de-acidified sour whey |
| 8 | eggs separated, yolks and whites separately beaten |
| 1 lb. | rice |
| 1 lb. | sugar |
| ½ oz. | salt |
| 3 oz. | lemon juice |
| 4 oz. | powdered sugar |
| | grated rind of 3 lemons |

Cook the rice in the whey in a double boiler until soft, add the sugar, lemon rind, lemon juice, salt and egg yolks. Stir gently and cook until thickened. Turn into a buttered dish and cool. Add the powdered sugar to the beaten egg whites, and cover the top of the pudding with the meringue. Bake at 350° F. until top of meringue is browned.

M. Chocolate Pudding

| | |
|---|---|
| 18 lbs. | de-acidified sour whey |
| 2 lbs. | unsweetened chocolate |
| 2½ lbs. | sugar |
| 1 lb. | cornstarch |
| ½ oz. | salt |
| 1 oz. | vanilla |

Heat all but 2 lbs. of the whey and the chocolate in a double boiler and stir until blended. Mix the other ingredients, add them and stir constantly until the mixture thickens, then occasionally for a total time of 15 minutes. Pour into a dish and chill.

N. Citrus Sherbet

| | |
|---|---|
| 12 lbs. | de-acidified sour whey |
| 6 lbs. | sugar |
| 4 doz. | egg yolks |
| 6 oz. | granulated gelatine |
| 1 lb. | water |
| 9 lbs. | orange juice |
| 4 oz. | lemon juice |
| | Gratings of one orange rind |

Put water, sugar, and grated rind in sauce pan, bring to boil, add slightly beaten egg yolks, cook 1 minute. Add gelatine soaked in water. Strain, cool, add fruit juices, and freeze.

O. Lemon Cream Sherbet

| | |
|---|---|
| 18 lbs. | de-acidified sour whey |
| 9 lbs. | sugar |
| 4 lbs. | lemon juice |
| 6 lbs. | cream |

Mix and freeze.

P. Frozen Custard

| | |
|---|---|
| 20 lbs. | de-acidified sour whey |
| 5 oz. | flour |
| 10 lbs. | sugar |
| 20 | eggs, slightly beaten |
| ½ oz. | salt |
| 3 oz. | vanilla |
| 49 lbs. | thin cream |

Mix flour, sugar and salt, add beaten egg, and gradually add the whey. Cook 10 minutes over hot water while stirring. When cool, add cream and flavoring, and freeze.

Q. Fruit Ice Cream

| | |
|---|---|
| 20 lbs. | sour whey |
| 40 lbs. | heavy cream |
| 6 doz. | egg whites beaten stiff |
| 20 lbs. | canned fruit (pulp and juice) |
| 10 oz. | lemon juice |

Mix ingredients except fruit, freeze to mush consistency, add fruit, finish freezing.

R. Chocolate Fudge

| | |
|---|---|
| 5 lbs. | butter |
| 15 lbs. | chocolate |
| 75 lbs. | syrup of de-acidified sour whey |

Melt butter, add other ingredients while heating and stirring until well mixed. Cook at 234° F. until a portion forms a soft ball when tried in cold water. Cool on a greased surface and cut in squares.

EXAMPLE 8

Chocolate Milk Drink

A chocolate milk drink is prepared, with equivalent properties obtained by two different recipes, one of which contains only conventional ingredients and proportions while the other contains the new product of Example 1.

| | Conventional | New |
|---|---|---|
| Deacidified Sour Whey | — | 9.7 |
| Standard Milk | 88.9 | 81.8 |
| 36% cream | 0.6 | 1.1 |
| Skim Milk Powder | — | 0.6 |
| Whey Powder | 1.1 | — |
| Sugar | 7.0 | 4.4 |
| Corn Sweetener | 1.8 | 1.8 |
| Cocoa | 0.6 | 0.6 |
| | 100.0 | 100.0 |

It is evident that in the second formula former waste material replaces nearly a tenth of the standard milk and more than a third of the sugar formerly required, with the only other required change being a slight increase in cream to keep the butter fat content in balance.

EXAMPLE 9

Commercial Grade Ice Cream

A standard commercial grade ice cream meeting the requirements of the local state law, and having a 10% milk fat content, contains the constituents listed in the left column below. A different composition, likewise meeting the requirements, contains the somewhat different constituents listed in the right column. These constituents, in pounds, together with the water content of the milk, produce 9,260 pounds or 1,000 gallons of ice cream mix.

| | Conventional | New |
|---|---|---|
| Milk fat | 926 | 926 |
| Non-fat Milk Solids | 555 | 555 |
| Dry Sweet Whey | 185 | — |
| Sucrose | 926 | 926 |
| Corn Sweetener | 971 | 436 |
| De-acidified Whey Solids: | | |
| Sugars | — | 360 |
| Proteins, etc. | — | 360 |
| Stabilizer | 37 | 37 |
| | 3,600 | 3,600 |

It is noteworthy that replacement of about half of the corn sweetener and all of the dry sweet whey by a product containing galactose, which is a very sweet sugar, permits a significant increase in proteins and other nutrients. At the same time the cost is reduced.

Since the whey when properly prepared as described above has either a greatly reduced lactose content, or is essentially free from lactic acid, the problems previously encountered in concentration and drying of sour whey are largely eliminated.

The sweet whey produced in the foregoing manner is not only sweet in the sense of being free from acidity, lacking the sour lactic acid flavor which is characteristic of cottage cheese whey, but is truly sweet in taste because of the presence in it of approximately one molecule of glucose and another molecule of galactose for each of the molecules of lactose in the original milk. When concentrated or dried, the whey becomes quite sweet because a major part of the solid content consists of this mixture of sweet flavored sugars.

For example, the sweet whey produced by the foregoing procedure is vacuum concentrated at a moderate temperature, to avoid denaturing the lactalbumin and globulin, to a concentration of about 50% solids. This liquid concentrate can be stored in bulk for reasonable periods of refrigerated. It is a highly nutritious material suitable for direct addition to ice cream or sherbet mixes or other sweet dairy products because of its pronounced sweet flavor.

While the procedures described above are presently preferred, they can be modified by using other equivalent treatments at various stages of the process.

Thus the splitting of lactose into glucose and galactose can occur after the separation of the whey from the curd instead of being initiated before souring of the milk. In this variation of the procedure, the lactase should be one of the commercially available kinds which is most active under acid conditions.

Also, instead of mixing a lactase enzyme through the entire volume of milk, or of whey, the lactase can be immobilized on the surface of a suitable substrate such as porous glass or equivalent inert solid material, as is well known. In that case, the liquid is passed through or over the immobilized enzyme at such a rate as to bring about substantially complete reaction.

Similarly, instead of deionization by means of contact with pellets of ion-exchange material, deionization can be brought about by passing the whey over or through diaphragms having suitable ion-exchange properties, and in either event the ion-exchange products can be made from a wide variety of different kinds of materials.

The ion-exchange materials used in sweetening the sour whey are easily and quickly regenerated when exhausted. The pellets or other form of cation-exchange resin may be regenerated with dilute hydrochloric acid, which is thereby converted into a solution of chlorides of the metals present in the original milk, principally calcium chloride, along with some magnesium, sodium, and potassium chloride.

The anion-exchange material may be regenerated by a dilute sodium hydroxide solution, which is thereby converted into a solution of the sodium salt of the lactic acid which was removed from the sour whey along with sodium salts of whatever other organic or inorganic acids may have been present. Alternatively, aqueous ammonia may be used for regeneration, if ammonium salts of the acids are not objectionable in the particular effluent situation of the dairy plant.

These solutions of the alkali and alkaline earth salts and of the organic acid salts produced in regeneration of the ion-exchange resins are relatively innocuous and have a low biological oxygen demand. They can be discharged into sewers or streams with little effect, particularly when diluted with the normal wash waters and other effluents from the dairy plant. The odors and the interference with normal clarification of sewage which result from discharge of sour whey are essentially all eliminated.

At the same time, substantially all of the nutritional values of the whey, in particular the sugar, the proteins, the lipids, and the vitamines, are recovered for use in foods, and in an improved form with greatly enhanced sweetness, and freedom from objectionable sour odor or taste, and also largely free or nearly completely free from lactose and the problems which its presence in food presents to so many people.

If a single stage de-acidification is preferred, the treatment with the cation-exchange material may be omitted. This has the advantage of retaining the calcium which many people do not consume in adequate quantities, but the disadvantage of retaining a somewhat high total salt content.

Unless there is an immediate use for the nutritional materials in the rather dilute form contained in the whey, the product may be concentrated by any convenient process, such as vacuum drying, ultra-filtration, or reverse osmosis. The concentration may be carried to any desirable extent, to produce a nutritional liquid of the proper water content for direct addition to other constituents of a food product, or if it is not to be used immediately it can be dried further to produce either a syrupy concentrate or a completely dried whey powder.

This invention can be carried out in many different modifications. These include use of different kinds of lactase, produced by different organisms, and having maximum effectiveness under different conditions of temperature, acidity, and salinity. Other differences include use of ion-exchange materials having different chemical compositions and functioning best under various different conditions including presence and concentration of particular materials, or different temperatures.

The two essential operations, of hydrolysis of lactose, and of deionization, can be carried out simultaneously or separately, and in different orders of succession, or after various preliminary operations such as sterilization or concentration.

I claim:

1. A process for converting sour whey, made by acidifying milk and removing the resulting curd, into sweet whey containing substantially all the food value of the whey, which process comprises splitting at least half of the lactose originally present in the milk by a lactase enzyme, and de-acidifying the whey by contact of the whey with an anion-exchange material, while retaining the non-ionizable substances in the whey.

2. A process as in claim 1 in which the enzyme is added to the milk before the ion-exchange treatment.

3. A process as in claim 2 in which the enzyme is added to the milk before it is acidified.

4. A process as in claim 3 in which the milk is acidified by the action of an acid-producing living organism.

5. A process as in claim 4 in which the organism also produces lactase.

6. A process as in claim 1 in which the ion-exchange material is a synthetic resin having anion-attracting functionality.

7. A process as in claim 5 in which the ion-exchange material is a synthetic resin having anion-attracting functionality.

8. A process as in claim 7 in which the whey is treated by successive contact with a cation-exchange resin and an anion-exchange resin.

9. A process as in claim 8 in which the cation-exchange resin has carboxylic functionality and the anion-exchange resin has amine functionality.

10. A process as in claim 9 in which the enzyme is added to the milk before it is curdled.

11. A process as in claim 1 in which the sweetened whey is at least partly dewatered.

12. A process as in claim 10 in which the sweetened whey is at least partly dewatered.

13. A process as in claim 1 in which nearly all of the lactose is split.

14. A process as in claim 12 in which nearly all of the lactose is split.

15. A sweet whey product made by the process of claim 1.

16. A sweet whey product made by the process of claim 14.

17. A process for converting sour whey into a palatable food product lacking the lactic acid flavor of the sour whey, which process comprises hydrolyzing lactose in the whey by a lactase enzyme, de-acidifying the whey by contact of the whey with anion-exchange material while retaining the non-ionizable substances in the whey, and adding other nutritional and flavoring ingredients.

18. A palatable food product made from sour whey, containing substantially all the nutritional values of the sour whey including the functional values of the lactose and proteins, improved by enzymatic conversion of lactose to a mixture of glucose and galactose and by removal of anions to minimize the pronounced acid flavor of the sour whey, and containing also nutritional and flavoring food ingredients other than those present in the whey.

19. A process as in claim 1 in which the whey is only partially de-mineralized, by dividing the whey into portions, de-acidifying one portion by contact with an ion-exchange material, and remixing the one portion with another portion which is not de-mineralized.

20. A process as in claim 19 in which the said one portion is about one-half of the whey, and after de-acidification it is remixed with the other half.

* * * * *